(12) United States Patent
Gupta et al.

(10) Patent No.: US 11,005,266 B2
(45) Date of Patent: May 11, 2021

(54) ELECTRICAL ASSEMBLY FOR A POWER TRANSMISSION NETWORK

(71) Applicant: General Electric Technology GmbH, Baden (CH)

(72) Inventors: Robin Gupta, Stafford (GB); Robert Stephen Whitehouse, Stafford (GB); Carl David Barker, Staffordshire (GB)

(73) Assignee: General Electric Technology GmbH, Baden (CH)

( * ) Notice: Subject to any disclaimer, the term of this patent is extended or adjusted under 35 U.S.C. 154(b) by 0 days.

(21) Appl. No.: 15/753,708

(22) PCT Filed: Aug. 18, 2016

(86) PCT No.: PCT/EP2016/069608
§ 371 (c)(1),
(2) Date: Feb. 20, 2018

(87) PCT Pub. No.: WO2017/032687
PCT Pub. Date: Mar. 2, 2017

(65) Prior Publication Data
US 2018/0241213 A1     Aug. 23, 2018

(30) Foreign Application Priority Data
Aug. 21, 2015 (GB) ..................... 1514934

(51) Int. Cl.
*H02J 3/36* (2006.01)
*H02H 7/22* (2006.01)
(Continued)

(52) U.S. Cl.
CPC .............. *H02J 3/36* (2013.01); *H02H 3/087* (2013.01); *H02H 7/22* (2013.01); *H02H 7/268* (2013.01);
(Continued)

(58) Field of Classification Search
CPC ........ H02M 5/271; H02M 7/68; H02M 7/145; H02M 1/32; H02M 2007/4835; H02J 3/36; H02J 3/18; H02H 7/22
See application file for complete search history.

(56) References Cited

U.S. PATENT DOCUMENTS 3,968,419 A * 7/1976 Ekstrom .................... H02J 3/36
363/50
4,769,751 A * 9/1988 Schraudolph ............. H02J 3/36
323/209
(Continued)

FOREIGN PATENT DOCUMENTS

EP       2 569 793 B1       3/2013
EP       2 633 597 A1       9/2013
(Continued)

OTHER PUBLICATIONS

Office Action issued in connection with corresponding EP Application No. 16757000.1 dated Oct. 16, 2018.
(Continued)

*Primary Examiner* — Yusef A Ahmed
(74) *Attorney, Agent, or Firm* — Eversheds Sutherland (US) LLP (57) ABSTRACT

There is provided an electrical assembly for use in a power transmission network. The electrical assembly includes a converter including terminals for connection to an electrical network, where the first terminal is a DC terminal. The assembly also includes a DC power transmission medium connected to the DC terminal, and a circuit interruption device including switching element(s) and an energy absorption element, each switching element being switchable to divert a flow of current in the DC power transmission medium through the energy absorption element in order to reduce the flow of current in the DC power transmission medium; The assembly also includes a converter control unit
(Continued)

programmed to operate the converter to control a DC voltage at the DC terminal in a leakage current reduction mode to control a voltage across the energy absorption element.

7 Claims, 6 Drawing Sheets

(51) Int. Cl.
| | |
|---|---|
| *H02J 3/18* | (2006.01) |
| *H02H 3/087* | (2006.01) |
| *H02H 7/26* | (2006.01) |
| *H02M 7/68* | (2006.01) |
| H02M 7/483 | (2007.01) |
| H02M 1/32 | (2007.01) |
| H02H 3/02 | (2006.01) |

(52) U.S. Cl.
CPC .............. *H02J 3/18* (2013.01); *H02J 3/1857* (2013.01); *H02M 7/68* (2013.01); *H02H 3/021* (2013.01); *H02M 1/32* (2013.01); *H02M 2007/4835* (2013.01); *Y02E 40/26* (2013.01); *Y02E 60/60* (2013.01)

(56) References Cited

U.S. PATENT DOCUMENTS

| | | | | |
|---|---|---|---|---|
| 5,392,184 A * | 2/1995 | Unterlass | ................ | H02H 7/16 |
| | | | | 361/15 |
| 5,489,838 A * | 2/1996 | Leowald | .............. | H02J 3/1807 |
| | | | | 323/209 |
| 5,870,293 A * | 2/1999 | Svensson | ................. | H02J 3/36 |
| | | | | 363/35 |
| 5,999,388 A * | 12/1999 | Asplund | ................ | H02H 3/087 |
| | | | | 323/908 |
| 6,157,290 A * | 12/2000 | Glatz-Reichenbach | ..................... | |
| | | | | H01C 7/027 |
| | | | | 338/22 R |
| 9,800,171 B2 * | 10/2017 | Tahata | ....................... | H02J 5/00 |
| 9,847,642 B2 * | 12/2017 | Jasim | ..................... | H02M 1/34 |
| 2009/0316446 A1 * | 12/2009 | Astrom | .................. | H02H 7/268 |
| | | | | 363/35 |
| 2012/0201059 A1 * | 8/2012 | Berggren | ............... | H02H 7/268 |
| | | | | 363/53 |
| 2012/0267955 A1 * | 10/2012 | Zhan | ........................ | H02J 1/06 |
| | | | | 307/31 |
| 2012/0299393 A1 | 11/2012 | Hafner et al. | | |
| 2013/0009491 A1 * | 1/2013 | Hafner | .................. | H02M 1/092 |
| | | | | 307/113 |
| 2013/0193766 A1 * | 8/2013 | Irwin | ...................... | H02H 7/268 |
| | | | | 307/82 |
| 2013/0229739 A1 * | 9/2013 | Juhlin | ...................... | H02H 9/04 |
| | | | | 361/86 |
| 2014/0313628 A1 | 10/2014 | Hafner et al. | | |
| 2015/0035364 A1 * | 2/2015 | Davidson | ............... | H02H 7/268 |
| | | | | 307/36 |
| 2015/0131189 A1 | 5/2015 | Davidson et al. | | |
| 2015/0146466 A1 | 5/2015 | Kim et al. | | |
| 2015/0236498 A1 * | 8/2015 | Davidson | ............... | H02H 3/087 |
| | | | | 361/57 |
| 2016/0006236 A1 * | 1/2016 | Tang | .................... | H01H 33/596 |
| | | | | 361/91.5 |
| 2016/0028222 A1 * | 1/2016 | Johansson | .............. | H01H 9/541 |
| | | | | 361/91.1 |
| 2016/0172990 A1 * | 6/2016 | Barker | .................... | H02M 1/32 |
| | | | | 363/35 |
| 2016/0197558 A1 * | 7/2016 | Whitehouse | .......... | H02M 7/483 |
| | | | | 363/35 |
| 2016/0211669 A1 * | 7/2016 | Barker | ...................... | H02J 3/36 |
| 2016/0276948 A1 * | 9/2016 | Adamczyk | ................ | H02J 1/02 |
| 2016/0336749 A1 * | 11/2016 | Barker | ...................... | H02J 3/36 |
| 2016/0380428 A1 * | 12/2016 | Barker | .................. | H02H 7/268 |
| | | | | 361/91.2 |
| 2017/0085121 A1 * | 3/2017 | Cairoli | .................... | H02J 9/061 |
| 2017/0163170 A1 * | 6/2017 | Tahata | ..................... | H02J 5/00 |
| 2017/0178844 A1 * | 6/2017 | Angquist | ............. | H01H 33/006 |
| 2017/0201094 A1 * | 7/2017 | Hassan | ..................... | H02J 3/36 |
| 2017/0331281 A1 * | 11/2017 | Whitehouse | ........... | H02H 3/021 |
| 2018/0013290 A1 * | 1/2018 | Outram | .................... | H02J 3/36 |

FOREIGN PATENT DOCUMENTS

| | | |
|---|---|---|
| WO | 2014/177874 A2 | 11/2014 |
| WO | 2015/007621 A1 | 1/2015 |
| WO | 2015/121983 A1 | 8/2015 |

OTHER PUBLICATIONS

Combined Search and Examination Report issued in connection with corresponding GB Application No. 1514934.7 dated Feb. 17, 2016.
International Search Report and Written Opinion issued in connection with corresponding PCT Application No. PCT/EP2016/069608 dated Nov. 16, 2016.
International Preliminary Report on Patentability issued in connection with corresponding PCT Application No. PCT/EP2016/069608 dated Feb. 27, 2018.

* cited by examiner

| Current (Amp) | Voltage (kV) | |
| --- | --- | --- |
| 0.0001 | 255.0 | |
| 0.0002 | 345.0 | |
| 0.0003 | 390.0 | |
| 0.0005 | 416.3 | |
| 0.001 | 435.0 | 90% of normal DC transmission line voltage |
| 0.003 | 465.0 | |
| 0.006 | 472.5 | |
| 0.01 | 480.0 | |
| 0.02 | 483.0 | |
| 0.05 | 489.0 | |
| 1 | 502.5 | Normal DC transmission line voltage |
| 10 | 517.5 | |
| 50 | 540.0 | |
| 125 | 555.0 | |
| 250 | 570.0 | |
| 500 | 588.0 | |
| 1000 | 615.0 | |
| 2000 | 645.0 | |
| 3000 | 663.8 | |
| 5000 | 697.5 | |
| 10000 | 750.0 | Surge Arrestor Rated Voltage |
| 20000 | 821.3 | |
| 40000 | 900.0 | |
| 65000 | 975.0 | |
| 100000 | 1065.0 | |

ELECTRICAL ASSEMBLY FOR A POWER TRANSMISSION NETWORK

BACKGROUND

This invention relates to an electrical assembly for use in a power transmission network, in particular a high voltage direct current (HVDC) power transmission network.

An electrical network may include a power source, such as a battery, that is connected to a load via one or more current-carrying conductors, or multiple power sources that are connected to multiple loads using a network of current-carrying conductors.

An example of an electrical network is a DC power grid that requires multi-terminal interconnection of HVDC converters, whereby power can be exchanged on the DC side using two or more HVDC converters electrically connected together. Each HVDC converter acts as either a source or sink to maintain the overall input-to-output power balance of the DC power grid whilst exchanging the power as required. The DC power grid relies on a network of DC power transmission lines or cables to achieve multi-terminal interconnection of the HVDC converters.

SUMMARY

According to an aspect of the invention, there is provided an electrical assembly for use in a power transmission network, the electrical assembly including:

- a converter including a first terminal and a second terminal for connection to an electrical network, the first terminal being a DC terminal;
- a DC power transmission medium operatively connected to the DC terminal;
- a circuit interruption device operatively connected to the DC power transmission medium, the circuit interruption device including at least one switching element and an energy absorption element, the or each switching element of the circuit interruption device being switchable to divert a flow of current in the DC power transmission medium through the energy absorption element in order to reduce the flow of current in the DC power transmission medium; and
- a converter control unit programmed to operate the converter to control a DC voltage at the DC terminal in a leakage current reduction mode so as to control a voltage across the energy absorption element to reduce a leakage current flowing in the DC power transmission medium subsequent to the reduction of the flow of current in the DC power transmission medium through the switching of the or each switching element of the circuit interruption device to divert the flow of current in the DC power transmission medium through the energy absorption element.

In use, the circuit interruption device is operated to interrupt the flow of current in the DC power transmission medium through the switching of the or each corresponding switching element to divert the flow of current in the DC power transmission medium through the energy absorption element. This allows the energy absorption element to provide a back electromotive force (EMF) to reduce the flow of current in the DC power transmission medium down to a level that effectively results in interruption of the flow of current in the DC power transmission medium.

However, following the interruption of the flow of current in the DC power transmission medium, a leakage current (also known as a residual current) continues to flow through the DC power transmission medium and the energy absorption element. The magnitude of the leakage current varies depending on the V-I characteristic of the energy absorption element and the DC voltage across the energy absorption element. The flow of the leakage current not only has the effect of continuous heating of the energy absorption element, which could result in thermal runaway of the energy absorption element, but also could interfere with the fault clearing process for the DC power transmission medium, particularly when the DC power transmission medium is of the overhead variety, since the fault clearing process would require the current in the DC power transmission medium to drop to zero and also require a time delay for de-ionisation before re-energizing the DC power transmission medium.

The provision of the converter control unit in the electrical assembly of the invention not only permits the reduction of the leakage current so as to avoid the aforementioned problems associated with the leakage current, thus improving the reliability and performance of the associated power transmission network, but also obviates the need for additional current reduction hardware to reduce the leakage current which would increase the size, weight and cost of the associated power transmission network.

The electrical assembly may further include a switching apparatus (e.g. a disconnector, an isolator, a mechanical switching apparatus, or the like) operatively connected to the DC power transmission medium, the switching apparatus being switchable to switch the DC power transmission medium out of circuit. The provision of the switching apparatus permits the reduction of the flow of current in the DC power transmission medium to zero following the interruption of the flow of current in the DC power transmission medium.

When the electrical assembly includes the switching apparatus, the converter control unit may be programmed to operate the converter to control a DC voltage at the DC terminal in the leakage current reduction mode so as to control a voltage across the energy absorption element to reduce the leakage current flowing in the DC power transmission medium to a value that permits safe opening of the switching apparatus prior to the switching of the switching apparatus to switch the DC power transmission medium out of circuit.

The provision of the converter control unit in the electrical assembly of the invention facilitates the switching of the switching apparatus at lower levels of the leakage current and DC voltage, which not only permits the use of a cheaper switching apparatus that operates at a lower current rating and a lower DC voltage rating but also enables faster operation of the switching apparatus as a result of its switching at a lower leakage current level.

It will be appreciated that the invention is applicable to any circuit interruption device including at least one switching element and an energy absorption element, where the or each switching element of the circuit interruption device are switchable to divert a flow of current in the DC power transmission medium through the energy absorption element in order to reduce the flow of current in the DC power transmission medium.

It will also be appreciated that the invention is applicable to an electrical assembly including a single converter or a plurality of converters operating in the leakage current reduction mode in conjunction with a single circuit interruption device or a plurality of circuit interruption devices and with a single DC power transmission medium or a plurality of DC power transmission media.

In embodiments of the invention the energy absorption element may include at least one non-linear resistive element. Optionally the or each non-linear resistive element may be a surge arrester. This results in a quicker and more effective means of reducing the leakage current, since the V-I characteristics of the non-linear resistive element may be configured such that the leakage current drops sharply with the change in voltage across the energy absorption element.

In further embodiments of the invention the converter may be configured to form a current path through which an uncontrolled converter current may flow between the second and DC terminals when the magnitude of the voltage at the second terminal is at a predefined value relative to the magnitude of the DC voltage at the DC terminal.

The control of the DC voltage at the DC terminal in the leakage current reduction mode may result in a change of the DC voltage at the DC terminal that causes the magnitude of the voltage at the second terminal to be at the predefined value relative to the magnitude of the DC voltage at the DC terminal, and thereby results in the formation of the current path through which the uncontrolled converter current may flow between the second and DC terminals. The flow of the uncontrolled converter current between the second and DC terminals is undesirable due to its adverse effects on the converter for reasons of reliability, performance and safety.

In such embodiments the converter control unit may be programmed to operate the converter to control the magnitude of the voltage at the second terminal so as to prevent the uncontrolled converter current from flowing between the second and DC terminals when the converter is operated to control the DC voltage at the DC terminal in the leakage current reduction mode. This ensures that the aforementioned adverse effects resulting from the flow of the uncontrolled converter current between the second and DC terminals are avoided.

Prevention of the flow of the uncontrolled converter current between the second and DC terminals through control of the magnitude of the voltage at the second terminal may be carried out in many ways, some examples of which are described as follows.

In embodiments of the invention in which the second terminal is an AC terminal and the electrical network is an AC network, the converter may be configured to form a current path through which an uncontrolled converter current may flow between the AC and DC terminals when the magnitude of the AC voltage at the AC terminal is at a predefined value relative to the magnitude of the DC voltage at the DC terminal.

In such embodiments the converter control unit may be programmed to operate the converter to control the magnitude of the AC voltage at the AC terminal so as to prevent the uncontrolled converter current from flowing between the AC and DC terminals when the converter is operated to control the DC voltage at the DC terminal in the leakage current reduction mode.

In further such embodiments of the invention the converter may be configured to form a current path through which an uncontrolled converter current may flow between the AC and DC terminals when the magnitude of the AC voltage at the AC terminal is higher than the magnitude of the DC voltage at the DC terminal, and the converter control unit may be programmed to operate the converter to control the magnitude of the AC voltage at the AC terminal to be lower than the magnitude of the DC voltage at the DC terminal so as to prevent the uncontrolled converter current from flowing between the AC and DC terminals when the converter is operated in the leakage current reduction mode.

In still further such embodiments the converter may include a plurality of second terminals, each second terminal being an AC terminal for connection to a respective phase of a multi-phase AC network, the converter is configured to form a current path through which an uncontrolled converter current may flow between the AC and DC terminals when the magnitude of the line-to-line AC voltage between a given two of the AC terminals is higher than the magnitude of the DC voltage at the DC terminal, and the converter control unit may be programmed to operate the converter to control the magnitude of the line-to-line AC voltage between the given two of the AC terminals to be lower than the magnitude of the DC voltage at the DC terminal so as to prevent the uncontrolled converter current from flowing between the AC and DC terminals when the converter is operated in the leakage current reduction mode.

In embodiments of the invention in which the second terminal is an AC terminal and the electrical network is an AC network, the converter control unit may be programmed to operate the converter to exchange reactive power with the AC network (e.g. absorb reactive power from or supply power to the AC network) to control the magnitude of the AC voltage at the AC terminal so as to prevent the uncontrolled converter current from flowing between the AC and DC terminals when the converter is operated in the leakage current reduction mode.

The feature of controlling the magnitude of the AC voltage at the AC terminal through exchange of reactive power with the AC network may be applied to a converter including half-bridge modules, each of which includes a pair of module switches connected in parallel with an energy storage device to permit the configuration of each half-bridge module to selectively provide a unidirectional voltage. In such a converter, the half-bridge modules may be arranged to form a chain-link converter operable to facilitate the transfer of power between the second and DC terminals.

In further embodiments of the invention where the converter is configured to form a current path through which an uncontrolled converter current may flow between the second and DC terminals when the magnitude of the voltage at the second terminal is at a predefined value relative to the magnitude of the DC voltage at the DC terminal, the converter may include at least one voltage source configured to provide a voltage to offset the voltage difference between the second and DC terminals so as to prevent the uncontrolled converter current from flowing between the second and DC terminals when the converter is operated to control the DC voltage at the DC terminal in the leakage current reduction mode. This allows the DC voltage at the DC terminal to be modified during the leakage current reduction mode without resulting in the flow of the uncontrolled converter current between the second and DC terminals. Consequently in such embodiments it is possible to omit the feature of the converter control unit being programmed to operate the converter to exchange reactive power with the AC network to control the magnitude of the AC voltage at the AC terminal so as to prevent the uncontrolled converter current from flowing between the AC and DC terminals when the converter is operated in the leakage current reduction mode.

An example of such a voltage source may include, but is not limited to, an energy storage device that is capable of storing and releasing energy to provide a voltage, such as a capacitor or a battery. The converter may include one or more switches that are switchable to selectively configure the or each voltage source to provide the voltage to offset the voltage difference between the second and DC terminals.

When the second terminal is an AC terminal, the electrical network is an AC network and the converter is configured to form a current path through which an uncontrolled converter current may flow between the AC and DC terminals when the magnitude of the AC voltage at the AC terminal is at the predefined value relative to the magnitude of the DC voltage at the DC terminal, the or each voltage source may be configured to selectively provide a positive voltage and a negative voltage. In this case the converter may include full-bridge modules, each of which includes two pairs of module switches connected in parallel with an energy storage device to permit configuration of the full-bridge module to selectively provide a bidirectional voltage.

The use of the or each voltage source to offset the voltage difference between the second and DC terminals is cost-efficient and space-efficient in arrangements of the converter in which the or each voltage source is also used in normal operation of the converter to transfer power between the second and DC terminals. For example, the converter may include a chain-link converter operable to facilitate the transfer of power between the second and DC terminals, and the or each voltage source may be an energy storage device within the chain-link converter structure. A chain-link converter may include a plurality of modules (e.g. a plurality of series-connected modules), each module including at least one module switch and at least one energy storage device, the or each module switch and the or each energy storage device in each module arranged to be combinable to selectively provide a voltage source.

In still further embodiments of the invention the second terminal may be a further DC terminal, and the electrical network may be a DC network.

It will be appreciated that the formation of the current path may vary depending on the components of the converter. For example, the converter may include at least one passive current check element arranged to form the current path through which the uncontrolled converter current may flow between the second and DC terminals when the magnitude of the voltage at the second terminal is at the predefined value relative to the magnitude of the DC voltage at the DC terminal.

A passive current check element may be any passive device that limits current flow therethrough to only one direction. An example of a passive current check element may be, but is not limited to, a diode.

BRIEF DESCRIPTION OF THE DRAWINGS

Preferred embodiments of the invention will now be described, by way of non-limiting examples, with reference to the accompanying drawings in which.

DETAILED DESCRIPTION

Figure 1:
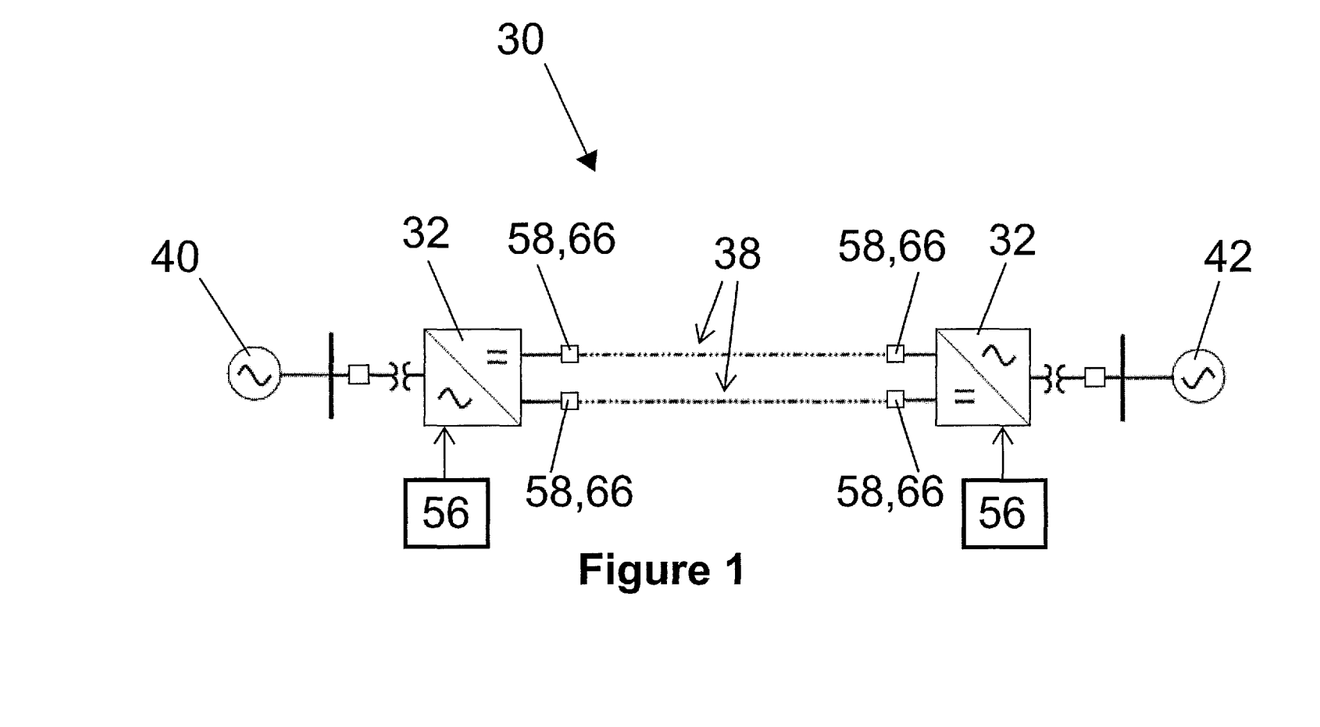
FIG. 1 shows schematically a DC power transmission scheme including an electrical assembly according to a first embodiment of the invention.

A first DC power transmission scheme is shown in FIG. 1 and is designated generally by the reference numeral 30.

The DC power transmission scheme 30 is in the form of a point-point DC power transmission scheme 30 that includes first and second converters. Each converter 32 includes a plurality of first terminals in the form of DC terminals 34 and a plurality of second terminals in the form of AC terminals 36. Each DC terminal 34 of the first converter 32 is operatively connected via a respective DC power transmission line 38 to a respective one of the DC terminals 34 of the second converter 32. In use, each AC terminal 36 of the first converter 32 is connected to a respective phase of a first multi-phase AC network 40, and each AC terminal 36 of the second converter 32 is connected to a respective phase of a second multi-phase AC network 42.

It is envisaged that, in other embodiments of the invention, each DC power transmission line 38 may be replaced by, but is not limited to, a submarine DC power transmission cable, an overhead DC power transmission cable, an underground DC power transmission cable, or any DC power transmission medium of transmitting electrical power between two or more electrical elements.

Figure 2:
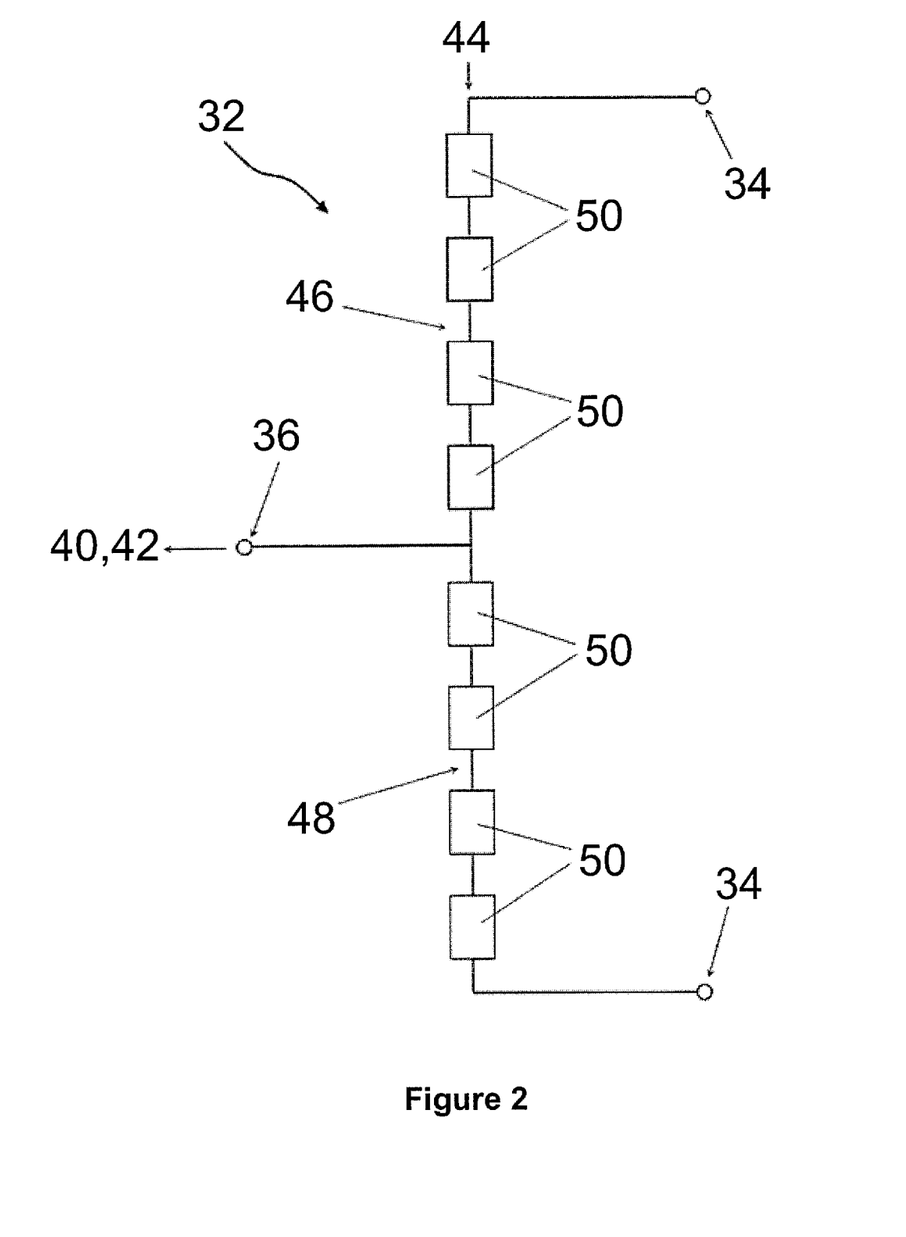
FIG. 2 shows schematically the structure of a converter limb of a converter of the electrical assembly of FIG. 1.

Each converter 32 shown in FIG. 1 defines an AC/DC voltage source converter 32 which includes a plurality of converter limbs 44, each of which is arranged as shown in FIG. 2.

In each converter 32, each converter limb 44 extends between the DC terminals 34, and includes: a first limb portion 46 that extends between one of the DC terminals 34 and a respective one of the AC terminals 36; and a second limb portion 48 that extends between the other of the DC terminals 34 and the same AC terminal 36.

Figure 3:
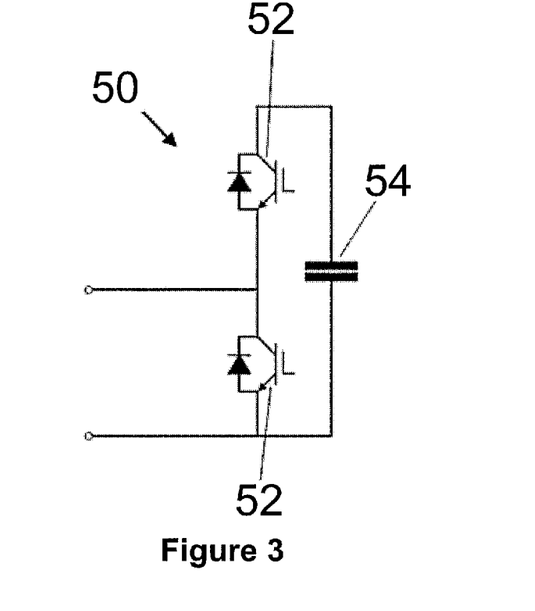
FIG. 3 shows schematically the structure of a 2-quadrant unipolar module.

Each limb portion 46,48 includes a plurality of series-connected modules 50 to define a chain-link converter. In the specific embodiment shown, each module 50 includes a pair of module switches 52 that are connected in parallel with a capacitor 54 in a half-bridge arrangement to define a 2-quadrant unipolar module 50 that can provide a unidirectional voltage and can conduct current in two directions, as shown in FIG. 3. Each module switch 52 constitutes an insulated gate bipolar transistor (IGBT), which is connected in parallel with an anti-parallel passive current check element in the form of a diode.

Each converter 32 further includes a converter control unit 56 programmed to operate the converter 32. Each converter control unit 56 is programmed to control the switching of the module switches 52 of the modules 50 of the corresponding converter 32 in order to operate each module 50 to selectively provide a voltage source. This enables each converter control unit 56 to operate the corresponding converter 32 to modify the DC voltage at each corresponding DC terminal 34 and to modify the AC voltage at each corresponding AC terminal 36.

It is envisaged that, in other embodiments of the invention, the first and second converters may share the same converter control unit 56.

The DC power transmission scheme 30 further includes a plurality of circuit interruption devices 58, each of which is connected at a respective end of the DC power transmission lines 38 such that each circuit interruption device 58 is operatively connected in series between the corresponding DC power transmission line 38 and one of the converters.

Figure 4:
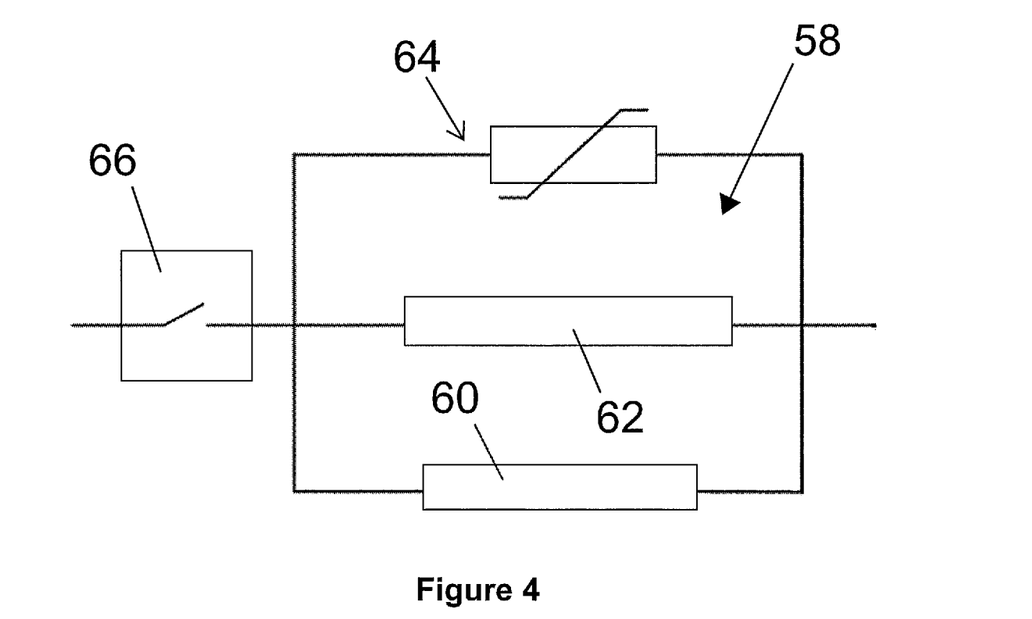
FIG. 4 shows schematically the structure of a circuit interruption device of the electrical assembly of FIG. 1.

FIG. 4 shows schematically the structure of each circuit interruption device 58.

Each circuit interruption device 58 includes a main branch 60, an auxiliary branch 62 and an energy absorption branch 64. The main branch 60 includes a semiconductor switch connected in series with a fast disconnector switch. The auxiliary branch 62 includes a plurality of series-connected insulated gate bipolar transistors (IGBT), and is connected in parallel with the main branch 60. The energy absorption branch 64 includes a plurality of surge arresters, each of which is connected in parallel with a respective one of the IGBTs of the auxiliary branch 62. Each surge arrester may be, for example, a zinc-oxide surge arrester.

It is envisaged that, in other embodiments of the invention, each IGBT may be replaced by one or more other semiconductor switching devices, each diode may be replaced by another type of passive current check element that limits current flow therethrough to only one direction, and/or each capacitor 54 may be replaced by another type of energy storage device that is capable of storing and releasing energy, e.g. a fuel cell or battery.

The DC power transmission scheme 30 further includes a plurality of switching apparatus, each of which is in the form of an isolator 66 and is connected in series with a respective one of the plurality of circuit interruption devices 58. In use, each isolator 66 may be opened to disconnect the corresponding DC power transmission line 38, i.e. switch the corresponding DC power transmission line 38 out of circuit.

During normal operation of the DC power transmission scheme 30, each converter control unit 56 controls the switching of the module switches 52 of the modules 50 of the corresponding converter 32 in order to operate the corresponding converter 32 to perform a power conversion operation to transfer power between its AC and DC terminals 36,34. Such operation results in the transmission of power between the multi-phase AC networks 40,42, which includes the transmission of power along the DC power transmission lines 38 between the converters. Meanwhile the current flowing through the DC power transmission lines 38 flows preferentially through the main branches 60 of the circuit interruption devices 58, and the isolators 66 are closed.

The DC power transmission lines 38 may experience a DC pole-to-pole fault 68 during the operation of the DC power transmission scheme 30. This results in the flow of a heavy fault current with a high rate of rise of current.

The operation of the DC power transmission scheme 30 to respond to the fault 68 will be described with reference to an electrical assembly including the first converter 32, one of the DC power transmission lines 38, and the series connection of the circuit interruption device 58 and isolator 66 operatively connected between the first converter 32 and the one of the DC power transmission lines 38. It will be appreciated that the following operation of the DC power transmission scheme 30 to respond to the fault 68 applies mutatis mutandis to an electrical assembly using a different converter 32, a different DC power transmission line 38 and/or a different series connection of the circuit interruption device 58 and isolator 66.

Figure 5:
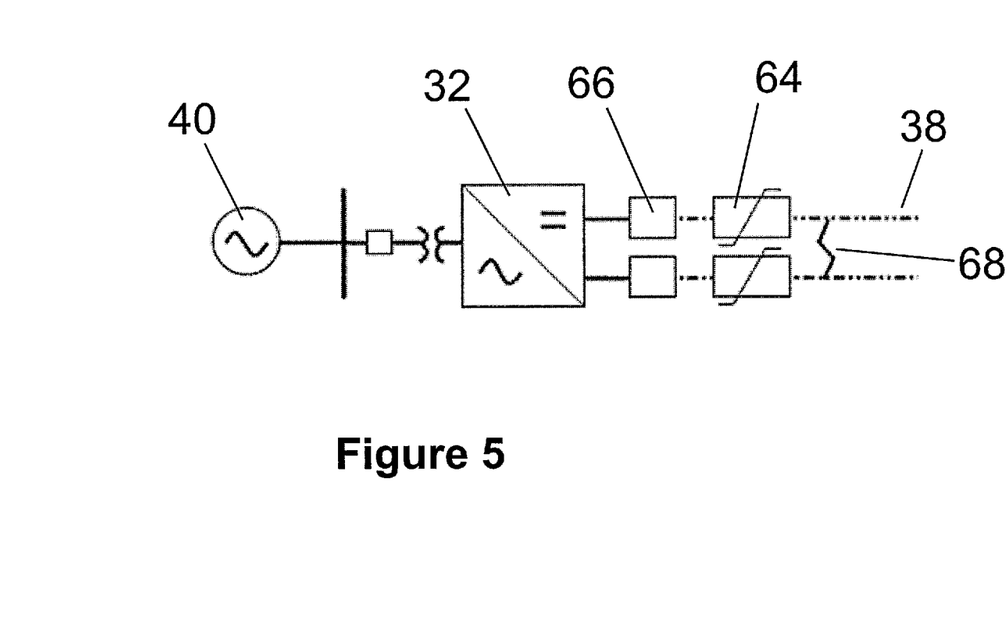
FIG. 5 shows the configuration of the DC power transmission scheme of FIG. 1 to direct current to flow through the energy absorption branch of the circuit interruption device of FIG. 4.

Once the fault 68 is identified, the semiconductor switch of the main branch 60 is turned off to cause commutation of current from the main branch 60 to the auxiliary branch so that the current flowing through the fast disconnector switch drops to zero. This allows the fast disconnector switch to open at zero current. Once the fast disconnector switch is opened, the IGBTs of the auxiliary branch are switched to commutate the current from the auxiliary branch to the energy absorption branch 64. FIG. 5 shows schematically the configuration of the DC power transmission scheme 30 to direct current to flow in the energy absorption branch 64 of the circuit interruption device 58. This allows the energy absorption branch 64 to provide a back EMF, typically 1.5 times the normal DC transmission line voltage, to reduce the flow of current in the DC power transmission line 38 down to a level that effectively results in interruption of the flow of current in the DC power transmission line 38.

In this manner the switching elements of the circuit interruption device 58 are switchable to divert a flow of current in the DC power transmission line 38 through the energy absorption branch 64 in order to reduce the flow of current in the DC power transmission line 38.

Following the interruption of the flow of current in the DC power transmission line 38, a leakage current continues to flow through the first converter 32, through the DC power transmission line 38, through the energy absorption branch 64 of the circuit interruption device 58, and to the fault 68. The magnitude of the leakage current varies depending on the V-I characteristics of the surge arresters and the DC voltage across the energy absorption branch 64, and at this time is typically in the range of a few hundred mA to 1-2 A.

At this stage the converter control unit 56 is programmed to operate the first converter 32 to control a DC voltage at the DC terminal 34 connected to the DC power transmission line 38 in a leakage current reduction mode so as to control the DC voltage across the energy absorption branch 64. More specifically, the DC voltage at the DC terminal 34 is controlled to reduce the DC voltage across the energy absorption branch 64 to reduce a leakage current flowing in the DC power transmission medium, since the V-I characteristics of the surge arresters are such that any current flowing through the energy absorption branch 64 drops sharply with the change in voltage across the energy absorption branch 64.

Figure 6:
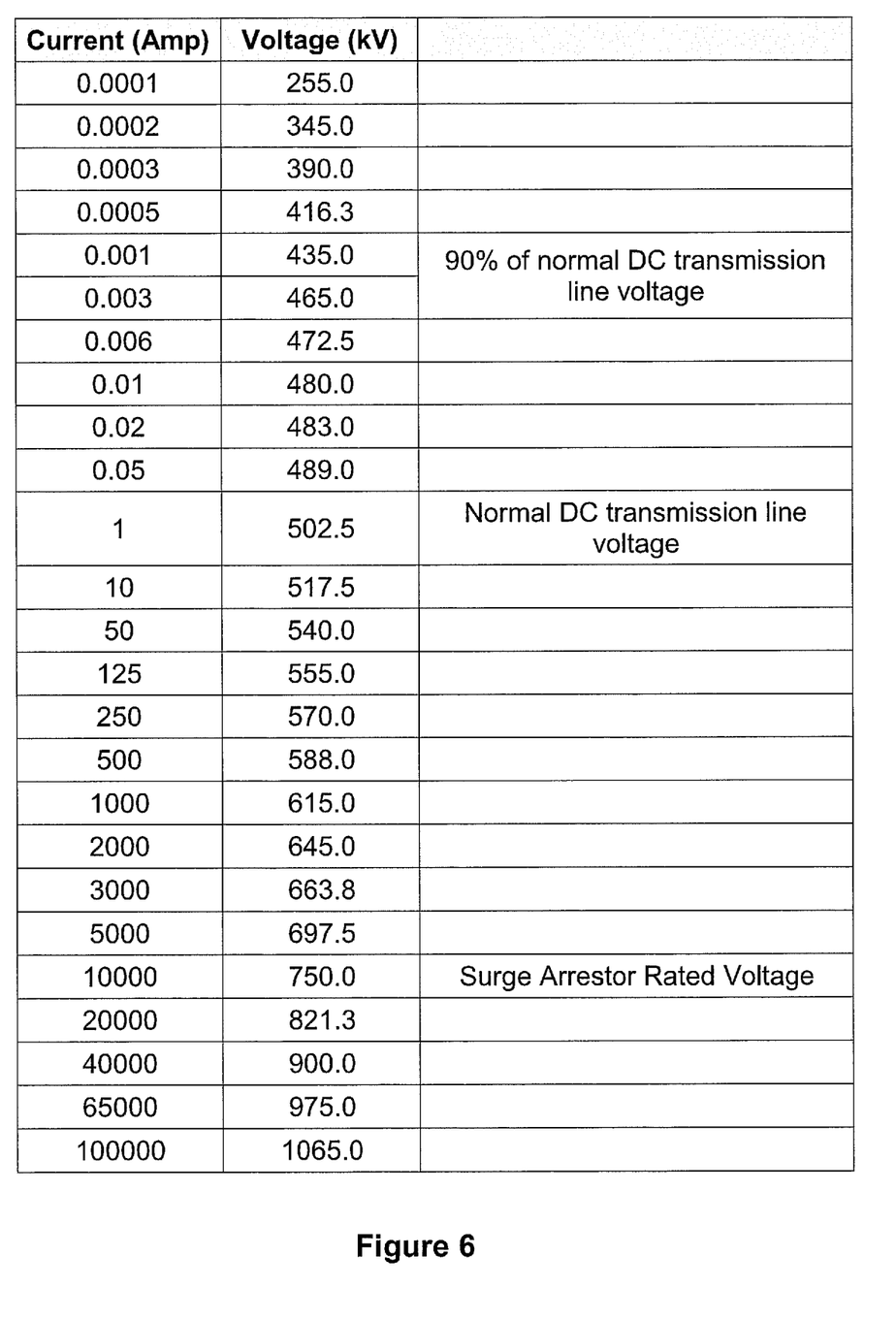
FIG. 6 sets out the variation in current flowing through the energy absorption branch of the circuit interruption device of FIG. 4 with DC transmission line voltage.
Figure 7:
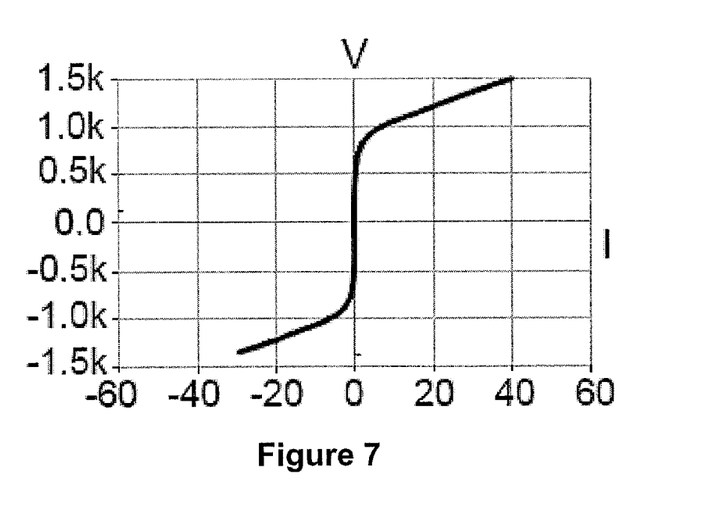
FIG. 7 illustrates graphically the V-I characteristic of each surge arrester of the energy absorption branch of the circuit interruption device of FIG. 4.

FIG. 6 sets out the variation in current flowing through the energy absorption branch 64 with DC transmission line voltage, and FIG. 7 illustrates graphically the V-I characteristic of each surge arrester. Controlling the DC voltage at the DC terminal 34 to reduce the DC transmission line voltage by 10% results in a corresponding 10% reduction in the DC voltage across the energy absorption branch 64, and it can be seen from FIG. 6 that this results in a significant reduction of the leakage current by approximately three orders of magnitude from 1 A to 0.001-0.003 A.

Subsequent to the reduction in leakage current, the isolator 66 is opened at the reduced leakage current level to disconnect the DC power transmission line 38. This reduces the flow of current in the DC power transmission line 38 to zero. The first converter 32 is required to operate in the leakage current reduction mode only throughout the time it takes for the isolator 66 to open. Since the isolator 66 only needs a small interval of time, typically 20-30 ms, to open, the first converter 32 is only required to operate in the leakage current reduction mode for the same small interval of time. Once the isolator 66 is opened, the DC voltage at the DC terminal 34 can be restored to its normal value.

The provision of the converter control unit 56 in the electrical assembly of FIG. 1 therefore not only permits the reduction of the leakage current so as to avoid thermal runaway of the energy absorption branch 64 and interference with the fault clearing process of the DC power transmission line 38, but also obviates the need for additional current reduction hardware to reduce the leakage current which would increase the size, weight and cost of the DC power transmission scheme 30.

The provision of the converter control unit 56 in the electrical assembly of FIG. 1 also facilitates the switching of the isolator 66 at lower levels of the leakage current and DC voltage, which not only permits the use of a cheaper isolator 66 that operates at a lower current rating and a lower DC voltage rating, but also enables faster operation of the isolator 66 as a result of its switching at a lower leakage current level.

During the fault 68, the use of the IGBT and anti-parallel diode pairs in each half-bridge module 50 means that the anti-parallel diodes of the first converter 32 form a current path through which an uncontrolled converter current may flow between the AC and DC terminals 36,34 when the magnitude of the line-to-line AC voltage between a given two of the AC terminals 36 is higher than the magnitude of the DC voltage at the DC terminal 34, which could arise as a result of a reduction of the DC voltage at the DC terminal 34 in the leakage current reduction mode.

To prevent the uncontrolled converter current from flowing between the AC and DC terminals 36,34 when the first converter 32 is operated in the leakage current reduction mode, the converter control unit 56 operates the first converter 32 to control the magnitude of the line-to-line AC voltage between the given two of the AC terminals 36 to be lower than the magnitude of the DC voltage at the DC terminal 34. This may be achieved by the converter control unit 56 operating the first converter 32 to exchange reactive power with the corresponding AC network 40 (e.g. absorb reactive power from or supply power to the AC network 40) to control the magnitude of the AC voltage at each AC terminal 36 so as to prevent the uncontrolled converter current from flowing between the AC and DC terminals 36,34 when the first converter 32 is operated in the leakage current reduction mode.

There is provided a second DC power transmission scheme, which is similar in structure and operation to the first DC power transmission scheme 30 of FIG. 1 and like features share the same reference numerals.

Figure 8:
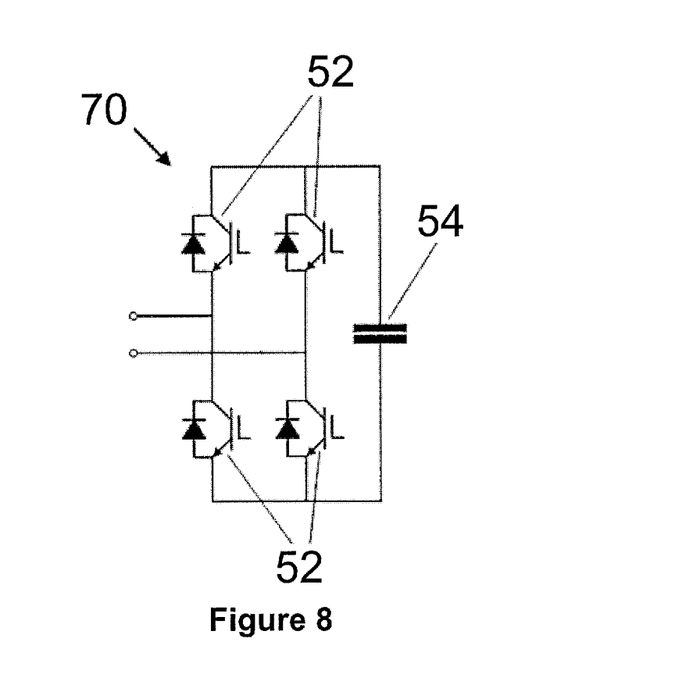
FIG. 8 shows schematically the structure of a 4-quadrant bipolar module of an electrical assembly according to a second embodiment of the invention.

The second DC power transmission scheme differs from the first DC power transmission scheme 30 in that, in each converter 32 of the second DC power transmission scheme, each module 70 is in the form of a 4-quadrant unipolar module 70 instead of a 2-quadrant unipolar module 50. More specifically, in each converter 32, each module 70 includes two pairs of module switches 52 that are connected in parallel with a capacitor 54 in a full-bridge arrangement to define a 4-quadrant bipolar module 70 that can provide a bidirectional voltage and can conduct current in two directions, as shown in FIG. 8.

The operation of the second DC power transmission scheme to respond to the fault 68 will be described with reference to an electrical assembly including the first converter 32, one of the DC power transmission lines 38, and the series connection of the circuit interruption device 58 and isolator 66 operatively connected between the first converter 32 and the one of the DC power transmission lines 38. It will be appreciated that the following operation of the DC power transmission scheme to respond to the fault 68 applies mutatis mutandis to an electrical assembly using a different converter 32, a different DC power transmission line 38 and/or a different series connection of the circuit interruption device 58 and isolator 66.

During the operation of the first converter 32 in the leakage current reduction mode, the converter control unit 56 controls the switching of the module switches 52 of the modules 70 of the first converter 32 to force the converter current to flow through one or more capacitors 54 and thereby enable one or more of the modules 70 to selectively provide positive and negative voltages to offset the voltage difference between the AC voltage at the corresponding AC terminal 36 and the DC voltage at the corresponding DC terminal 34.

The provision of the 4-quadrant bipolar modules 70 to selectively provide positive and negative voltages to offset the voltage difference between the AC voltage at the corresponding AC terminal 36 and the DC voltage at the corresponding DC terminal 34 prevents the uncontrolled converter current from flowing between the AC and DC terminals 36,34 when the first converter 32 is operated to control the DC voltage at the DC terminal 34 in the leakage current reduction mode, even when the magnitude of the line-to-line AC voltage between a given two of the AC terminals 36 is higher than the magnitude of the DC voltage at the DC terminal 34 connected to the DC transmission line 38. This allows the DC voltage at the DC terminal 34 to be modified during the leakage current reduction mode without resulting in the flow of the uncontrolled converter current between the AC and DC terminals 36,34. It is therefore possible, in the second DC power transmission scheme, to omit the feature of the converter control unit 56 being programmed to operate the first converter 32 to exchange reactive power with the AC network 40 to control the magnitude of the AC voltage at the AC terminal 36 so as to prevent the uncontrolled converter current from flowing between the AC and DC terminals 36,34 when the first converter 32 is operated in the leakage current reduction mode.

It is envisaged that, in other embodiments of the invention, the converter may be in the form of a DC-DC converter with a plurality of second terminals in the form of further DC terminals, instead of AC terminals. In such embodiments, the converter control unit is programmed to operate the DC-DC converter to control a DC voltage at the DC terminal connected to the DC power transmission line in a leakage current reduction mode, which is identical to the leakage current reduction mode described above with reference to the first DC power transmission scheme 30.

Also, in such embodiments employing the use of a DC-DC converter, any uncontrolled converter current may be prevented from flowing between the further DC terminals and the DC terminals through: direct control of the DC voltage at each further DC terminal; or the use of one or more modules to provide a voltage to offset the voltage difference between the further DC terminals and the DC terminals in a similar manner as that described above with reference to the second DC power transmission scheme.

It is also envisaged that, in other embodiments of the invention, the invention may be applicable to other types of faults, such as a pole-ground fault or a pole to pole to ground fault.

It will be appreciated that the invention is applicable to non-fault circumstances requiring the disconnection of a given DC power transmission line 38, which may include operational circumstances such as DC power transmission line maintenance or segregation for transmission security reasons.

It will also be appreciated that the topologies and configurations of the DC power transmission scheme 30 and the converters 32,72 were merely chosen to illustrate the working of the invention and that the invention is applicable to other topologies and configurations of the DC power transmission scheme and the converters. For example, the DC power transmission scheme may be in the form of a multi-terminal DC power grid.

The invention claimed is:

1. An electrical assembly for use in a power transmission network, the electrical assembly comprising:
    a converter including: a first terminal and a second terminal, wherein the first terminal is a DC terminal, wherein the second terminal is an AC terminal, and wherein the AC terminal is connected to an AC network;
    a DC power transmission medium operatively connected to the DC terminal;
    a circuit interruption device connected in series to the DC power transmission medium, the circuit interruption device including at least one switching element and an energy absorption element, the switching element of the circuit interruption device being switchable to divert a flow of current in the DC power transmission medium through the energy absorption element in order to reduce the flow of current in the DC power transmission medium; and
    a converter control unit programmed to operate the converter to control a DC voltage at the DC terminal in a leakage current reduction mode so as to control a voltage across the energy absorption element to reduce a leakage current flowing in the DC power transmission medium subsequent to the reduction of the flow of current in the DC power transmission medium through the switching of the or each switching element of the circuit interruption device to divert the flow of current in the DC power transmission medium through the energy absorption element,
    wherein the converter control unit is programmed to operate the converter to control a magnitude of an AC voltage at the AC terminal to be lower than a magnitude of the DC voltage at the DC terminal by exchanging reactive power with the AC network connected to the AC terminal so as to prevent a converter current from flowing between the AC and DC terminals when the converter is operated in the leakage current reduction mode, and
    wherein the converter is configured to form a current path through which the converter current is permitted to flow between the AC and DC terminals when the magnitude of the AC voltage at the AC terminal is higher than the magnitude of the DC voltage at the DC terminal.

2. The electrical assembly according to claim 1, further including a switching apparatus operatively connected to the DC power transmission medium, the switching apparatus being switchable to disconnect the DC power transmission medium from a circuit, wherein the converter control unit is programmed to operate the converter to control the DC voltage at the DC terminal in the leakage current reduction mode so as to control a voltage across the energy absorption element to reduce the leakage current flowing in the DC power transmission medium to a value that permits safe opening of the switching apparatus prior to the switching of the switching apparatus to disconnect the DC power transmission medium from the circuit.

3. The electrical assembly according to claim 1, wherein the energy absorption element includes at least one non-linear resistive element.

4. The electrical assembly according claim 1, wherein the converter includes at least one voltage source configured to provide a voltage to offset a voltage difference between the AC and DC terminals so as to prevent the converter current from flowing between the AC and DC terminals when the converter is operated to control the DC voltage at the DC terminal in the leakage current reduction mode.

5. The electrical assembly according to claim 4, wherein the or each voltage source is configured to selectively provide a positive voltage and a negative voltage.

6. The electrical assembly according to claim 1, wherein the converter includes at least one passive current check element arranged to form the current path through which the converter current is permitted to flow between the AC and DC terminals when the magnitude of the voltage at the AC terminal is at a predefined value relative to the magnitude of the DC voltage at the DC terminal.

7. An electrical assembly for use in a power transmission network, the electrical assembly comprising:
    a converter including: a first terminal and a second terminal, wherein the first terminal is a DC terminal, wherein the second terminal is an AC terminal, and wherein the AC terminal is connected to an AC network;
    a DC power transmission medium operatively connected to the DC terminal;
    a circuit interruption device connected in series to the DC power transmission medium, the circuit interruption device, the circuit interruption device including at least one switching element and an energy absorption element, the or each switching element of the circuit interruption device being switchable to divert a flow of current in the DC power transmission medium through the energy absorption element in order to reduce the flow of current in the DC power transmission medium; and
    a converter control unit programmed to operate the converter to control a DC voltage at the DC terminal in a leakage current reduction mode so as to control a voltage across the energy absorption element to reduce a leakage current flowing in the DC power transmission medium subsequent to the reduction of the flow of current in the DC power transmission medium through the switching of the or each switching element of the circuit interruption device to divert the flow of current in the DC power transmission medium through the energy absorption element,
    wherein the converter is configured to form a current path through which a converter current is permitted to flow between the AC and DC terminals when a magnitude of a voltage at the AC terminal is at a predefined value relative to the magnitude of the DC voltage at the DC terminal, and the converter includes at least one voltage source configured to provide a voltage to offset a voltage difference between the AC and DC terminals so as to prevent the converter current from flowing between the AC and DC terminals when the converter is operated to control the DC voltage at the DC terminal in the leakage current reduction mode.

* * * * *